United States Patent [19]

Holden

[11] Patent Number: 4,545,639
[45] Date of Patent: Oct. 8, 1985

[54] MOVABLE ELECTRICAL CONTACT CAPABLE OF ACCOMMODATING DEVICES EXHIBITING A PLURALITY OF DIFFERENT SIZES

[75] Inventor: Irving H. Holden, Boca Raton, Fla.

[73] Assignee: Motorola, Inc., Schaumburg, Ill.

[21] Appl. No.: 511,426

[22] Filed: Jul. 6, 1983

[51] Int. Cl.[4] .............................................. H01R 9/12
[52] U.S. Cl. ................................................. 339/256 R
[58] Field of Search ............ 339/252 R, 252 S, 253 R, 339/253 S, 254, 255 R, 255 P, 256, 258 T

[56] References Cited

U.S. PATENT DOCUMENTS

| | | | |
|---|---|---|---|
| 1,877,671 | 9/1932 | Koch, Jr. | 339/252 S |
| 2,357,274 | 8/1944 | Tresise et al. . | |
| 2,907,810 | 10/1959 | Detwiler et al. . | |
| 3,071,639 | 1/1963 | Mendelson et al. . | |
| 3,535,996 | 10/1970 | Winkler et al. . | |
| 3,829,826 | 8/1974 | Brown et al. | 339/255 R |
| 3,881,961 | 5/1975 | Nation . | |
| 3,897,268 | 7/1975 | Haraguchi . | |
| 4,109,064 | 8/1978 | Warner et al. . | |
| 4,161,568 | 7/1979 | Lund . | |
| 4,206,274 | 6/1980 | Peels . | |

FOREIGN PATENT DOCUMENTS 1213024  3/1966  Fed. Rep. of Germany ... 339/253 R

Primary Examiner—Joseph H. McGlynn
Attorney, Agent, or Firm—Joseph T. Downey; Edward M. Roney; Daniel K. Nichols

[57] ABSTRACT

An electrical contact assembly is provided which is capable of accommodating batteries for other electrical devices exhibiting a plurality of different physical sizes. A V-shaped contact arm having a hook-shaped member at one end thereof and a double torsion spring at the remaining end thereof is mounted to a battery housing surface. The double torsion spring end of the V-shaped member is mounted on a support post and is fixedly held in position such that the torsion spring does not freely rotate. The hook-shaped end of the V-shaped member is engaged by a second post adjacent to the first post so as to place the contact arm under tension. The tip of the V-shaped member thus forms an elbow which deflects to a greater or lesser degree depending upon the size of the electrical device to be contacted.

7 Claims, 2 Drawing Figures

MOVABLE ELECTRICAL CONTACT CAPABLE OF ACCOMMODATING DEVICES EXHIBITING A PLURALITY OF DIFFERENT SIZES

BACKGROUND OF THE INVENTION

This invention relates to electrical contacts for electrical devices, and more particularly to movable electrical contacts capable of accommodating a plurality of devices exhibiting different sizes.

DESCRIPTION OF THE PRIOR ART

In the course of the development of the electrical arts, many approaches have been employed for achieving electrical connection to electrical devices such as batteries. Generally, the battery is situated in a chamber. Batteries are often cylindrically shaped and include positive and negative electrical contact surfaces at their opposed ends, respectively. The problem is to achieve a high quality electrical and mechanical connection to these positive and negative battery surfaces so that the battery may be connected to external electrical circuitry. As noted, many electrical contacts have been developed for this purpose. For example, leaf springs have been employed in the past in battery housing chambers to make electrical and mechanical contact with the positive and negative battery contact surfaces. Unfortunately, once such leaf spring type contacts are permanently mounted in the battery chamber, they are generally not capable of achieving contact with batteries exhibiting a relatively wide range of sizes. Moreover, such leaf spring type contacts generally exhibit a relatively low contact force on the positive and negative battery terminal surfaces.

Another type of conventional battery contact is the metallic extension-compression spring. Such springs are typically situated in a battery chamber at the opposed ends thereof so as to contact respective positive and negative battery terminal surfaces of a battery situated in the chamber. Unfortunately, such conventional extension-compression springs tend not to be conductive to loading of the battery in a housing wherein the battery is loaded into the housing by moving the battery in a direction perpendicular to the main axis of the battery which lies between the end contacts thereof. Moreover, such extension-compression springs generally do not accommodate batteries exhibiting a relatively wide range of sizes while maintaining sufficient contact force to achieve a quality electrical contact.

One object of the present invention is to provide an electrical contact which is capable of accommodating electrical devices exhibiting a relatively wide range of physical sizes.

Another object of the present invention is to provide an electrical contact which exhibits a relatively high contact force on a contact surface of an electrical device so as to achieve a quality electrical connection.

These and other objects of the invention will become apparent to those skilled in the art upon consideration of the following description of the invention.

BRIEF SUMMARY OF THE INVENTION

The present invention is directed to providing an electrical contact for achieving high quality electrical connections to electrical devices exhibiting a relatively wide range of physical sizes.

In accordance with one embodiment of the invention, an electrical contact assembly includes a housing for containing a device to be electrically contacted. The housing includes a mounting surface. The assembly further includes a torsion spring having a coil axis situated perpendicular to the mounting surface. The torsion spring includes coil ends and a movable contact region. A mounting member mounts the torsion spring perpendicular to the mounting surface. A holding member holds the torsion spring contact region in a first predetermined position. The contact region is deflectable to a second predetermined position depending on the size of the device to be contacted.

In accordance with another embodiment of the invention, an electrical contact assembly includes a housing for containing a device to be electrically connected. The housing includes a surface with a support post situated extending from such surface. A torsion spring is situated wound around the support post. The torsion spring includes ends fixedly mounted to the housing. The torsion spring further includes a longitudinal axis and a contact arm extending away from a central region of the spring near the axis. A portion of the contact arm is bent back substantially toward the axis so as to form an elbow at the bend thus formed in the arm. A hook-shaped segment is situated at an end of such portion. An engaging element is situated on the housing to engage the hook portion so as to place the arm under tension. Thus, a device to be electrically contacted, such as a battery, is situated so as to contact the elbow of the torsion spring arm. The electrical contact of the invention is capable of accommodating devices of different sizes in a manner such that larger devices deflect the elbow to a greater extent than smaller devices.

The features of the invention believed to be novel are set forth with particularity in the appended claims. The invention itself, however, both as to organization and method of operation, together with further objects and advantages thereof, may best be understood by reference to the following description taken in conjunction with the accompanying drawings.

DETAILED DESCRIPTION OF THE PREFERRED EMBODIMENT

Figure 1:
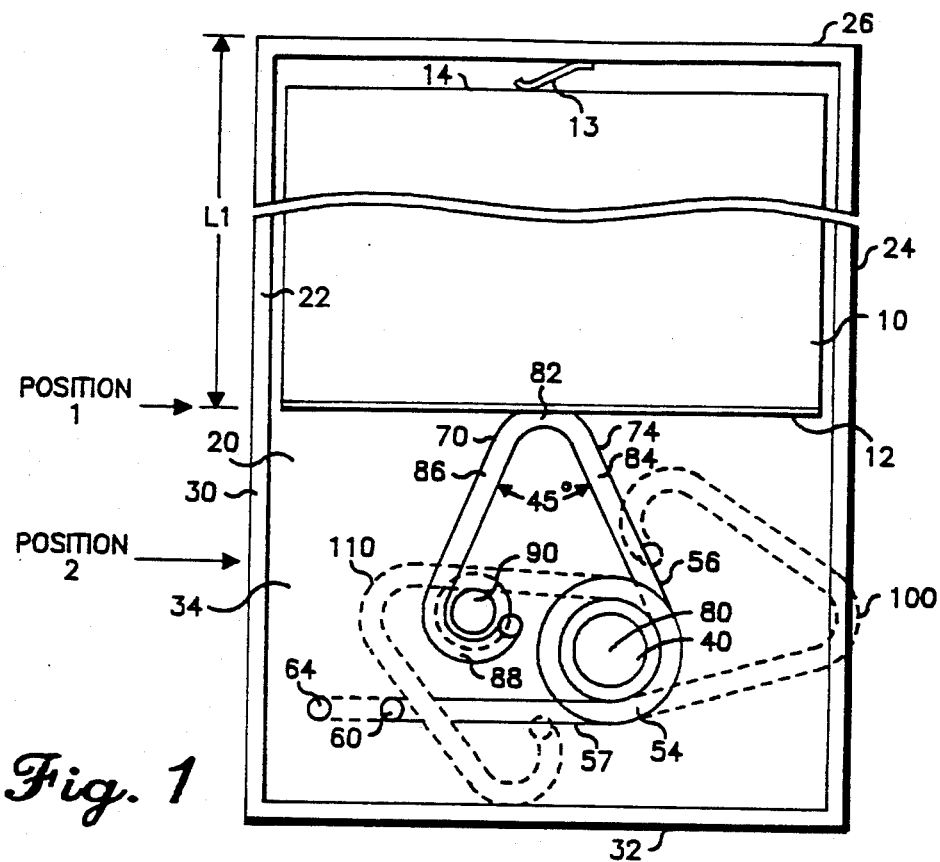
FIG. 1 is a representation of the electrical contact of the present invention.

FIG. 1 illustrates one embodiment of the electrical contact assembly of the present invention. Although, by way of example, the electrical contact assembly of FIG. 1 is shown contacting an electrical battery device 10, those skilled in the art will appreciate that the contact assembly of FIG. 1 is also used to achieve electrical connection to other electrical devices. Battery 10 includes an electrical contact surface or terminal 12 to which electrical connection is desired.

Battery 10 is situated in a chamber 20 formed between sidewalls 22 and 24 of a battery housing 30. Chamber 20 is shaped to accommodate the geometry of the battery to be situated therein, for example, rectangular or cylindrical. Battery housing 30 further includes top and bottom walls 26 and 32 which are situated so as to join sidewalls 22 and 24 as shown in FIG. 1. Battery 10 is shown resting on a battery housing surface 34 to which the electrical contact of the present invention is situated in a manner subsequently described. It is noted that in the view of FIG. 1, the portion of battery housing 30 facing the observer is cut away such that the observer may conveniently view battery 10 and the electrical contact of the invention therebelow.

Figure 2:
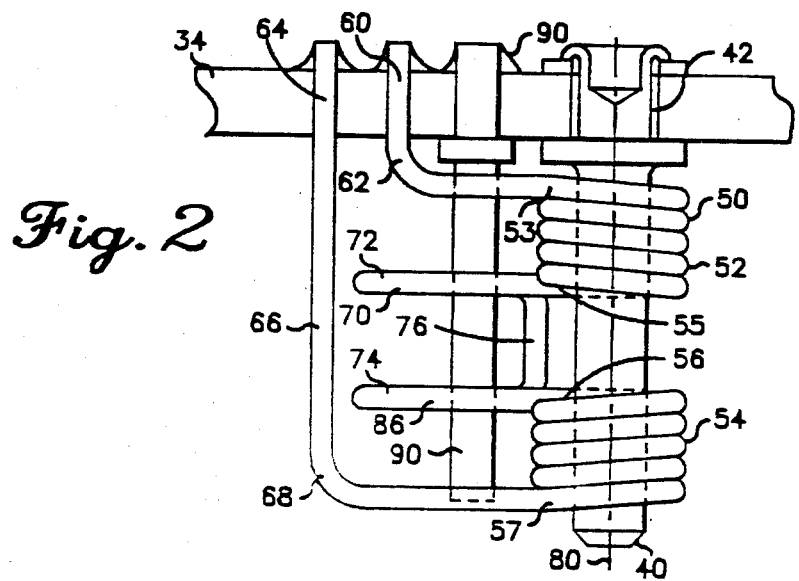
FIG. 2 is a top view representation of the electrical contact of FIG. 1 shown in a deflected position.

As seen in FIG. 1 and more clearly in FIG. 2, a support post 40 is fixedly mounted in an aperture 42 in housing surface 34. FIG. 2 shows the contact of the invention in position 110 (later described) as viewed from top wall 26. Support post 40 exhibits a substantially cylindrical geometry and is sufficiently long to accommodate a double torsion spring thereon in the manner subsequently described. Support post 40 is mounted substantially perpendicular to housing surface 34 as shown in FIG. 2. A double torsion spring 50 including spring sections 52 and 54 is wound to fit around support post 40. Spring 50 is fabricated from a gauge of wire exhibiting a diameter of approximately 0.5 millimeters in one embodiment of the electrical contact of the invention. Spring section 52 and spring section 54 are each formed of approximately 5 turns of the aforementioned gauge wire wound to fit around support post 40 in the manner shown in FIG. 2. Spring section 52 includes ends 53 and 55. Spring section 54 includes ends 56 and 57. Ends 53 and 57 are outer ends and are referred to as the ends of torsion spring 50.

The wire which forms spring section 52 extends beyond the spring section 52 from end 53 and into an aperture 60 in housing surface 34. The portion of spring section 50 extending between end 53 and aperture 60 is designated as spring mounting portion 62. Spring mounting portion 62 is fixedly attached to housing surface 34 by a solder connection of mounting portion 62 to surface 34 at aperture 60 in this embodiment of the invention. Thus, spring end 53 of spring section 52 is prevented from rotating when torque is applied to remaining spring end 55 by a battery in a manner subsequently described. Those skilled in the art may employ other techniques to fixedly hold spring end 53 stationary, such as clamping or gluing end 53 to a stationary member for example, and such other techniques are intended to be within the scope of the present electrical contact invention. Such techniques are also employed to hold end 57 stationary as later described.

The wire forming spring section 54 extends beyond spring section 54 from spring end 57 and into an aperture 64 in housing surface 34 as shown in FIG. 2. The portion of spring section 54 extending between spring end 57 and aperture 64 is designated as spring mounting portion 66. As shown in FIG. 2, spring mounting portion 66 includes a rounded bend 68 exhibiting an angle of approximately 90° near the mid-portion of spring mounting portion 66. Spring mounting portion 66 is fixedly attached to housing surface 34 via a solder connection of mounting portion 66 to surface 34 at aperture 64 or other techniques such that spring section end 57 is prevented from moving when torque is applied to spring section end 56 in the manner subsequently described.

As seen in FIG. 2, spring section 52 and spring section 54 are wound on a common longitudinal axis 80 of post 40 and are separated by a predetermined distance therebetween, approximately equal to 2.2 millimeters in one embodiment of the invention. A V-shaped contact arm 70 is included in and extends from spring section ends 55 and 56 as shown in FIG. 2, and more clearly in FIG. 1. Arm 70 appears V-shaped when viewed along the line of the common longitudinal axis 80 through spring sections 52 and 54. In FIG. 2, contact arm 70 is shown in deflected position 2 (dashed line 110 [see FIG. 1) which is discussed later in more detail.

Contact arm 70 includes side arms 72 and 74 extending from spring section ends 55 and 56, respectively. A bridging member 76 extends between the ends of side arms 72 and 74 to mechanically connect each to the other. Side arms 72 and 74 are substantially identical. In the view of FIG. 1, one of such side arms, namely side arm 74, is clearly shown. Side arm 74 extends from spring section end 56 outward away from spring axis 80 for a distance of 5 millimeters at which point, designated elbow 82, the wire forming side arm 74 is bent to form an angle of approximately 45° as shown in FIG. 1. Elbow 82 is designated the center point of V-shaped contact arm 70. Elbow 82 divides side arm 74 into an inner arm 84 and an outer arm 86 with the aforementioned approximately 45° angle therebetween. The end of outer arm 86 most distant from elbow 82 includes a hook-shaped member 88. Side arm 72 is not shown in FIG. 1 because it is immediately below side arm 74 and thus hidden from view. Since side arm 72 is substantially identical to and aligned with sidearm 74, it is appreciated that sidearm 72 includes inner and outer arms with an elbow therebetween, and further includes a hook-shaped member, all being oriented with respect to each other in a manner substantially identical with the orientation of the corresponding members of sidearm 74.

A post 90 is fixedly attached to housing surface 34 in an orientation adjacent to and substantially parallel with post 40. Post 90 is situated in an aperture 92 and is soldered to housing surface 34 in this embodiment of the invention. Post 90 operates to engage the hook-shaped members (for example member 88) formed at the ends of side arms 72 and 74, respectively, of FIG. 2. It is noted that side arms 72 and 74 both include hook-shaped members at their respective ends. However, only a hook-shaped member 88 is shown in FIG. 1 because side arm 72 with its hook-shaped member is situated in such a manner as to be hidden by side arm 74 in the view of FIG. 1. Post 90 is situated mounted to housing surface 34 in a position with respect to post 40 and axis 80 so as to engage hook-shaped member 88 and the hook-shaped member of side arm 72 so as to place contact arm 70 under tension.

The dashed line representation in FIG. 1 which is designated 100 illustrates the appearance of the electrical contact assembly of the invention prior to the contact arm 70 being placed under tension by engaging the hook portions of the arm with post 90. The non-dashed line portion of FIG. 1 shows the electrical contact assembly with the present invention with elbow 82 contacting the center of battery terminal 12 of a relatively small battery 10. This battery position is designated position 1. It is noted that the electrical contact assembly of the present invention advantageously accommodates electrical devices such as batteries exhibiting a size relatively larger than a battery which causes elbow 82 to be deflected to position 1. That is, a battery or other electrical device may be so long as to deflect elbow 82 to position 2 as shown in the dotted line contact designated 110 in FIG. 1. In one embodiment of the invention, the distance between position 1 and position 2 is approximately 3 millimeters, thus resulting in an electrical contact assembly which is capable of accommodating electrical devices which vary in length by as much as 3 millimeters. Those skilled in the art will appreciate that by altering the dimensions of the aforementioned elements which constitute the present electrical contact assembly, such contact assembly accommodates electrical devices having lengths which vary by amounts less than or greater than 3 millimeters. Those skilled in the art will also appreciate that sidewalls 22 and 24 are made sufficiently long and are separated by a sufficient distance to accommodate a selected battery in the chamber thus formed therein.

As seen in FIG. 1, a battery device is situated in the open area between elbow 82 and upper wall 26 which connects walls 22 and 24 to define the space which battery 10 occupies. An extension spring 13 is centrally situated on wall 26 to achieve contact to battery terminal 14. The vertical distance between position 1 of elbow 82 and wall 26 as measured vertically is designated L1. It is seen that by varying the length of L1, the size battery which the battery contact assembly is capable of accommodating is varied. However, even when a particular value for L1 is selected, which is approximately equal to the size of the battery to be accommodated by the electrical contact assembly of FIG. 1, still larger batteries are in fact capable of being accommodated by the battery contact assembly because such batteries which are relatively larger than L1 will cause elbow 82 to deflect from position 1 to position 2 or one of the many positions in between, according to the dimensions of the battery device actually placed in the battery contact assembly.

Those skilled in the art will appreciate that although the above description refers to members 60, 62, 50, 52, 54, 72, 74, 66, and 68 as separate elements that all of these elements are in fact fabricated from a single wire in the preferred embodiment of the invention.

The foregoing describes an electrical contact assembly which is capable of accommodating a plurality of electrical devices each exhibiting a different size.

While only certain preferred features of the invention have been shown by way of illustration, many modifications and changes will occur to those skilled in the art. It is, therefore, to be understood that the present claims are intended to cover all such modifications and changes as fall within the true spirit of the invention.

What is claimed is:

1. An electrical contact assembly comprising:
    housing means for containing a device to be electrically contacted, said housing means including a mounting surface;
    a torsion spring having a coil axis situated perpendicular to said mounting surface, said torsion spring including coil ends and a movable contact region,
    mounting means for mounting said torsion spring perpendicular to said mounting surface,
    holding means for holding said torsion spring contact region in a first predetermined position, said contact region being deflectable to a second predetermined position depending on the size of the device to be contacted,
    said movable contact region comprising a V-shaped member, when viewed along the line of said coil axis, having first and second ends and a center point, said first end being mechanically connected to at least one of said coil ends to provide spring action to said V-shaped member, and
    the second end of the V-shaped member including a hook-shaped portion for engaging said holding means.

2. An electrical contact assembly comprising:
    housing means for containing a device to be electrically contacted, said housing means including a mounting surface;
    a torsion spring having a coil axis situated perpendicular to said mounting surface, said torsion spring including coil ends and a movable contact region;
    mounting means for holding said torsion spring perpendicular to said mounting surface,
    holding means for holding said torsion spring contact region in a first predetermined position, said contact region being deflectable to a second predetermined position depending on the size of the device to be contacted,
    said movable contact region comprising a V-shaped member, when viewed along the line of said common longitudinal axis, having first and second ends and a center point, said first end being mechanically connected to at least one of said coil ends to provide spring action to said V-shaped member, and
    said second end of V-shaped member including a hookshaped portion for engaging said holding means.

3. The electrical contact assembly of claim 2 wherein said holding means comprises a post.

4. An electrical contact assembly comprising:
    housing means for containing a device to be electrically connected, said housing means including a surface, a support member being situated extending from said surface;
    a torsion spring situated wound around said support member and including ends fixedly mounted to said surface, said torsion spring including a longitudinal axis and a contact arm extending away from said axis, a portion of said contact arm being bent back substantially toward said axis so as to form an elbow at the bend thus formed in said arm, a hook-shaped segment being situated at an end of said portion;
    engaging means situated on said housing for engaging said hook portion so as to place said arm under tension,
    whereby a device to be electrically contacted is situated so as to contact the elbow of said torsion spring arm, said electrical contact assembly being capable of accommodating devices of different sizes in a manner such that larger devices deflect said elbow to a greater extent than smaller devices.

5. The electrical contact assembly of claim 4 wherein said support means comprises a substantially cylindrical support post.

6. A electrical contact assembly of claim 4 wherein said torsion spring comprises a double torsion spring including first and second torsion spring sections oriented on a common longitudinal axis.

7. The electrical contact assembly of claim 6 wherein said first and second spring sections are separated by a predetermined distance therebetween, said contact arm being connected to each of said first and second torsion spring sections.

* * * * *